March 4, 1958   A. B. F. G. RICHARDSON ET AL   2,825,589
SEALING GLANDS
Filed Oct. 12, 1955   2 Sheets-Sheet 1

Inventors
ARThUR BRUCE FRASER
GillEspiE RichARdSON
and RoNAld Hinds
By
Attorneys March 4, 1958 A. B. F. G. RICHARDSON ET AL 2,825,589
SEALING GLANDS
Filed Oct. 12, 1955 2 Sheets-Sheet 2
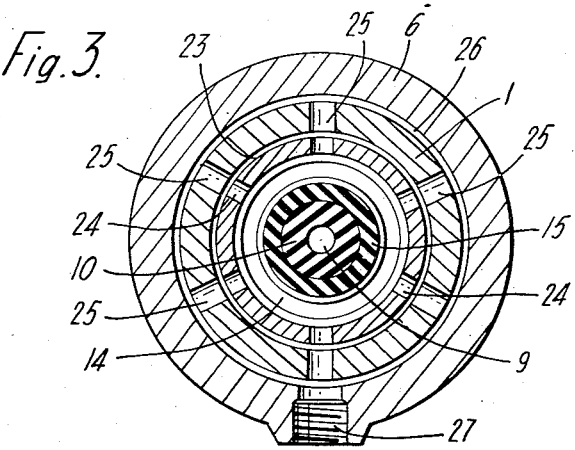
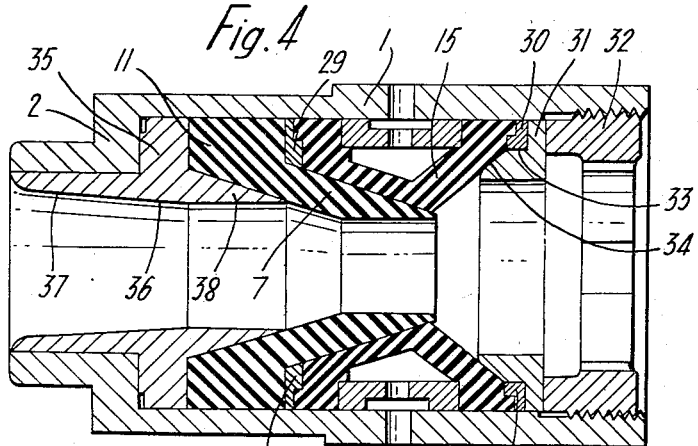
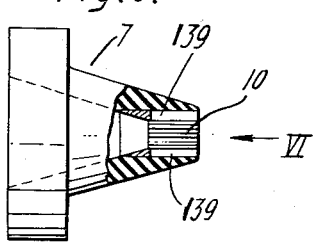
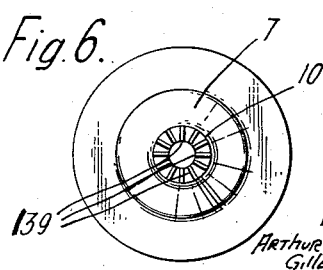
Inventors
Arthur Bruce Fraser
Gillespie Richardson
and Ronald Hinds
By Hope Leonard Buell
their Attorneys

United States Patent Office 2,825,589
Patented Mar. 4, 1958

2,825,589

SEALING GLANDS

Arthur Bruce Fraser Gillespie Richardson, Lancashire, and Ronald Hinds, Cheshire, England, assignors to British Insulated Callender's Cables Limited, London, England, a British company Application October 12, 1955, Serial No. 540,102

Claims priority, application Great Britain October 18, 1954

5 Claims. (Cl. 286—16)

This invention relates to sealing glands for limiting the escape of fluid under super-atmospheric pressure from a vessel through an outlet in the wall of the vessel during the passage therethrough of an insulated wire or cable or other elongated body of substantially uniform cross-section along its length, all of which elongated bodies are hereinafter included in the term "cable." In particular it is concerned with such sealing glands as comprise one or more than one conical soft rubber bush mounted in a housing and pointing in the direction of travel of the cable and having at its apex a central aperture for the passage of the cable.

By the present invention we provide an improved sealing gland. In this gland the conical soft rubber bush is surrounded by an annular chamber having a wall of soft rubber on which pressure can be exerted by fluid in the chamber to cause such wall to bear resiliently upon the conical bush to reduce its bore and maintain it in contact with the surface of the cable passing through it.

In this specification where the context permits the term "rubber" includes natural and synthetic rubber and other polymeric compounds or mixtures of polymeric compounds, which are rubbery and elastic at the operating temperatures of the gland and otherwise suitable for the purpose in view.

The tip of the soft rubber bush may be of a rubber or other material that is harder or more wear-resisting material than the rubber of which the body of the bush is made. In such cases the tip, which is moulded into the main part of the bush, may be provided with radial slots to add flexibility and facilitate its closure on the insulated wire or cable.

The annular chamber may be formed by a tube of soft rubber the outer part of the wall of which is directly or indirectly supported by the housing in which the soft rubber bush is mounted or it may be a tube the inner part of the wall of which is of soft rubber and the outer part of the wall of which is of relatively rigid material, for instance, hard rubber, a plastic or metal, and capable of supporting without material distention the internal pressure exerted on it by the fluid within the tube. In the latter event the inner and outer parts of the wall may be permanently united or be separable but adapted to make compression joints with one another at their adjoining circumferentially extending edges. Provision may be made for the admission of fluid under pressure to the tube at a number of points around its periphery but since the tube is entirely or substantially an hermetically closed chamber this is not essential for the obtaining of uniform pressure on the soft rubber bush.

Sealing glands constructed in accordance with the invention are described hereinafter in more detail by way of example and with reference to the accompany drawings wherein:

Figure 3 is a sectional view on the line III—III and as seen in the direction of the arrows in Figure 1;

Figure 4 is a sectional view of a modification of the arrangement shown in the previously mentioned figures;

Figure 5 shows a modified form of the conical bush; and

Figure 6 is a view in the direction of the arrow VI in Figure 5.

Figures 1, 2:
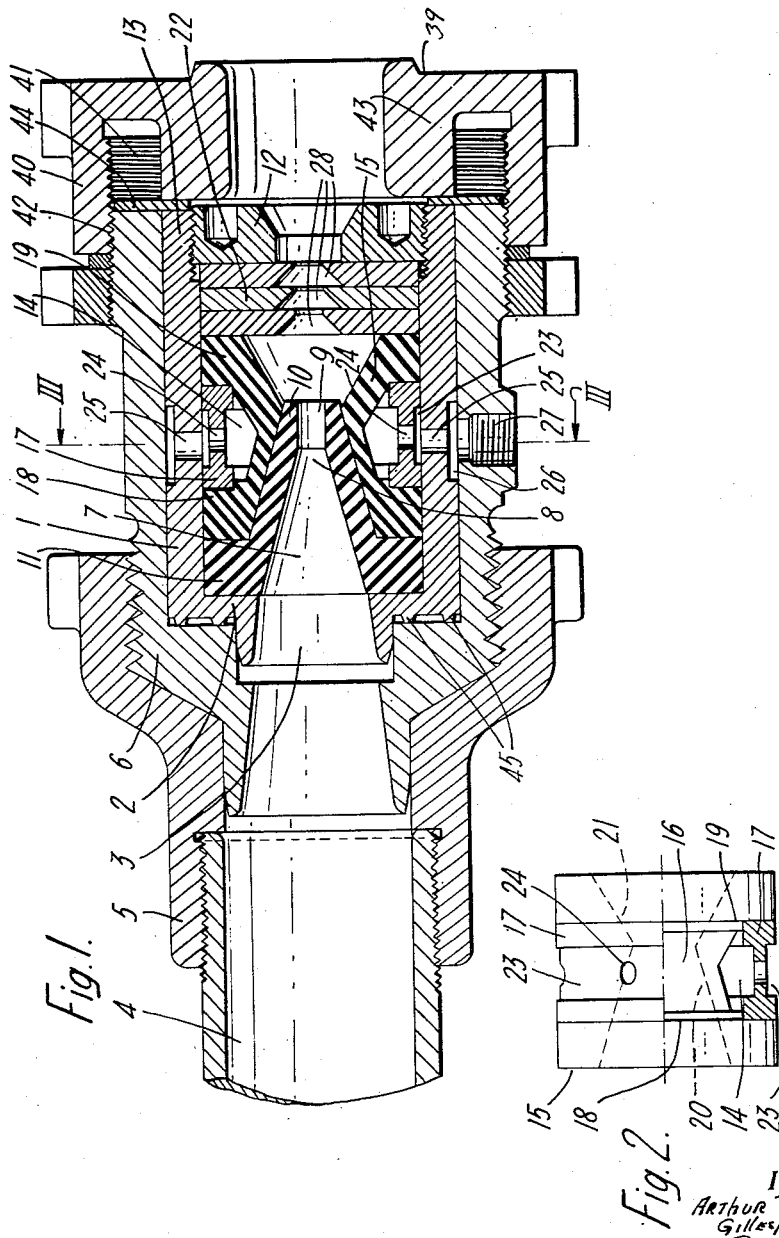
Figure 1 is a sectional view of a gland arranged at the outlet from a continuous vulcanisation machine.
Figure 2 is a view in part section of a portion of the arrangement shown in Figure 1.

Referring first of all to Figures 1, 2 and 3, the improved sealing gland comprises a housing in the form of a hollow cylinder 1 having at one end an end wall 2 with a central aperture 3. The central aperture 3 provides for the passage of a cable in the form of a rubber-covered wire from the end of a tubular fluid-filled pressure chamber 4 in a continuous vulcanisation machine. The cylindrical member 1 is attached to the end of the chamber 4 by screw couplings 5 and 6. Within the cylinder 1 there is centrally located a conical soft rubber bush 7 which provides a passage tapering from the end which is adjacent to the aperture 3 towards the other end 8. At the smaller end the tapered passage is continued as a passage 9 extending through the tip 10 of the bush 7 with its walls substantially parallel to the axis. The bush 7 is provided at its end of larger diameter with an externally projecting flange 11 which provides for the central location of the bush 7 in the cylinder 1. The flange 11 is clamped between the apertured end wall 2 and a side wall 18 of a member 15, described below, under pressure exerted by an axially adjustable clamping member 12 which is in screw threaded engagement with the internal wall of the cylinder 1 at its open end 13. The conical rubber bush 7 is surrounded by an annual chamber 14 which is disposed between the flange 11 of the bush and the clamping member 12. The chamber 14 is formed, as shown in Figure 2, of a ring 15 of soft rubber having in its external surface an annular groove 16 which is closed by a metal ring 17, this ring serving as a distance piece between the side walls 18 and 19 of the groove 16. The bore of the soft rubber ring 15 comprises a converging portion 20 corresponding in shape and diameter to the external surface of the conical rubber bush 7 which it surrounds. From the apex 10 of the conical bush 7 the bore of the ring 15 again increases in diameter to form a conical or bell-mouthed outlet 21. A group 22 of washers form a distance piece placed between the clamping member 12 and the adjacent end face of the soft rubber ring 15. On tightening the clamping member 12 by screwing it into the cylinder 1, pressure tight joints are made between the flange 11 of the conical bush 7 and the end wall 2 of its housing, between flange 11 and the side wall 18 of the rubber ring 15 and between the latter and the housing 1. The metal ring 17 has in its external surface a shallow circumferentially extending recess 23. Circumferentially spaced holes 24 lead from the bottom of this recess 23 to the interior of the toroidal chamber 14. In the cylindrical wall 1 of the housing there are provided circumferentially spaced holes 25 leading into the recess 23 from a similar recess 26 in the external surface of the housing wall. This enables fluid supplied under pressure, through an entry 27 in the support for the housing 1, into the outer recess 26 to have access through the holes 25 and 24 to the interior of the annular chamber 14 irrespective of the angular position of that chamber in its housing. The pressure exerted by the fluid in the annular chamber 14 causes the soft rubber wall of the chamber to bear resiliently upon the conical bush 7 so as to reduce the bore 9 at the apex 10 and maintain the inner surface of the bore 9 in sealing contact with the surface of the cable which is drawn through it. This provides a seal preventing, or substantially preventing, the escape of pressure fluid from the chamber 4 past the relatively moving contiguous surfaces of the cable and bush.

The group of washers 22 which form the distance piece between the ring 15 and the clamping member 12 have tapering apertures 28 which co-operate to form an auxiliary seal of the labyrinth type. This group of washers may be replaced by a single member as in the arrangement described below.

In the arrangement shown in Figure 4 there are provided metal rings 29 and 30 between each end of the soft rubber ring 15 and the adjoining members. The object of these rings 29 and 30 is to prevent the rim of the soft rubber ring 15 from being forced inwards due to the fluid pressure within the annular chamber. Each of the rings 29 and 30 is formed on the ring-engaging face with a stepped peripheral surface providing a seating of a reduced diameter which enters a circumferential recess in the adjacent end of the ring 15. A single distance piece 31 is provided between the clamping ring 32 and the metal ring 30. On its inner face the distance piece 31 is provided with an extension 33 of reduced diameter which provides a circumferential seating for the ring 30. The extension 33 is continued beyond the seating for the ring 30 by a portion 34 having an inwardly tapering surface which provides an additional support inside the end of the soft rubber ring 15. There is also provided a metal distance piece 35 located between the flange 11 of the rubber bush 7 and the inside of the end wall 2 of the cylindrical housing 1. This distance piece 35 is an external flange on a metal bush 36 extending outwardly to provide a tapered inlet 37 and extending inwardly as an externally tapered portion 38 to form an additional seating and support for this end of the rubber bush 7.

In the arrangement shown in Figures 5 and 6 the tip 10 of the rubber bush 7 is made of harder and more wear resisting material than the rubber of which the body of the bush is made. The tip 10 is a substantially cylindrical portion which is moulded into the main part of the bush and is divided by a number of axially extending radial slots 139 to add flexibility to the construction and to facilitate the closure of the tip on to the cable.

The housing for the conical rubber washer 7 and ring 15, that is the cylindrical member 1, is particularly suitable for mounting, in the manner in accordance with the invention described in the specification of our co-pending U. S. application Serial No. 540,101, filed on October 12, 1955, in the form of an inner housing or cartridge which is removably positioned in an outer housing (hereinafter termed the "gland housing"). Such an arrangement is generally indicated in the present Figure 1, the gland housing comprising the cylindrical part 6 in which the cylindrical housing 1 is held by a centrally apertured cap 39 having an outer part 40 with an internal screw thread 41 for engaging an external screw thread 42 on the open end of the gland housing 6. The cap 39 has an inner annular part 43 which is adapted to exert endwise pressure to hold the cylindrical housing 1 in place. The arrangement of the ports 25 extending through the wall of the cylindrical housing into the shallow circumferentially extending recess 26 in the external wall of the cylindrical housing 1 or cartridge facilitates the insertion of the latter in the gland housing in any angular position whilst still providing for the pressure fluid flow between an opening 27 in the wall of the gland housing and the openings 25 in the wall of the inner housing or cartridge.

Seals will be provided between the inner and outer housings to prevent escape between them of fluid from the vessel such as the chamber 4 in Figure 1 and of the pressure fluid fed to the annular chamber 14 and also to prevent transfer of fluid between the vessel, such as the chamber 4, and the supply passages to the chamber. In the present Figure 1, such seals are represented by the washer 44 held in place by the screw cap 39 against the ends of the inner and outer housings 1 and 6, and by the two annular accurately machined ribs 45 formed on the inner end face 2 of the inner cylindrical housing 1 and bearing against the inner end wall of the gland housing 6. These and other seals are more fully described in the specification of the said co-pending application.

What we claim as our invention is:

1. A sealing gland for use at an outlet in a wall of a vessel to limit escape of fluid under pressure from the vessel during the passage of a cable through the outlet, said gland comprising a housing, a conical rubber bush mounted in said housing and pointing in the direction of travel of the cable, said bush being centrally apertured at its apex for the passage of the cable, an annular enclosure within said housing and defining an annular chamber which surrounds said bush said enclosure having a soft rubber wall and being adapted to receive fluid under pressure whereby said soft rubber wall can be caused to press resiliently upon said bush, and said bush being radially reducible under such resilient pressure to press the apex of the bush into contact with the surface of a cable extends through the apex.

2. A sealing gland for use at an outlet in a wall of a vessel to limit escape of fluid under pressure from the vessel during the passage of a cable through the outlet, said gland comprising a housing, a conical rubber bush mounted in said housing and pointing in the direction of travel of the cable, said bush being centrally apertured at its apex for the passage of the cable, an annular enclosure within said housing and defining an annular chamber which surrounds said bush, said enclosure having a soft rubber wall and being adapted to receive fluid under pressure whereby said soft rubber wall can be caused to press resiliently upon said bush, the apex of said bush being of harder material than that of the remainder of the bush, and said bush being radially reducible under such resilient pressure to press the apex of the bush into contact with the surface of a cable extending through the apex.

3. A sealing gland as claimed in claim 2, wherein the apex of the bush is radially slotted to add to its flexibility.

4. A sealing gland for use at an outlet in a wall of a vessel to limit escape of fluid under pressure from the vessel during the passage of a cable through the outlet, said gland comprising a hollow cylindrical housing, a conical soft rubber bush mounted in said housing and pointing in the direction of travel of the cable, said bush being centrally apertured at its apex for the passage of the cable, a centrally apertured wall at one end of said housing, an axially adjustable clamping member in screw-threaded engagement with the other end of the housing, an external radial flange on the large end of said bush, a soft rubber ring surrounding said bush in said housing and being provided with an external circumferential groove, a metal ring closing said groove to form with said rubber ring an annular chamber, said metal ring extending as a distance piece between the side walls of the groove to transmit clamping pressure from said clamping member to clamp said flange against said end wall and said annular chamber being adapted to receive fluid under pressure whereby said soft rubber ring can be caused to press resiliently upon said bush.

5. A sealing gland for use at an outlet in a wall of a vessel to limit escape of fluid under pressure from the vessel during the passage of a cable through the outlet, said gland comprising a housing, a conical rubber bush mounted in said housing and pointing in the direction of travel of the cable, said bush being centrally apertured at its apex for the passage of the cable, an annular enclosure within said housing and defining an annular chamber which surrounds said bush, said annular enclosure having a soft rubber wall and being adapted to receive fluid under pressure whereby said soft rubber wall can be caused to press resiliently upon said bush, said bush being radially reducible under such resilient pressure to press the apex of the bush into contact with the surface of a cable passing through it, said soft rubber wall being a ring having a conical portion corresponding in internal shape and diameter to the external surface of the bush and a diverging conical portion increasing in diameter from the region of the apex of the bush to form a conical outlet.

References Cited in the file of this patent

UNITED STATES PATENTS

| | | |
|---|---|---|
| 1,930,361 | Kilmer | Oct. 10, 1933 |
| 2,258,887 | Fortune | Oct. 14, 1941 |
| 2,307,575 | Davis | Jan. 5, 1943 |
| 2,476,324 | Reich | July 19, 1949 |
| 2,548,412 | Walker | Apr. 10, 1951 |